United States Patent
Vaillant

[19]

[11] Patent Number: 6,064,127
[45] Date of Patent: *May 16, 2000

[54] SWITCH NETWORK

[75] Inventor: Bruno Vaillant, Toulouse, France

[73] Assignee: Alcatel, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,873

[22] Filed: May 1, 1998

[30] Foreign Application Priority Data

May 2, 1997 [FR] France ................................ 97 05448

[51] Int. Cl.[7] ................................................ H01H 19/64
[52] U.S. Cl. .......................................... 307/113; 307/139
[58] Field of Search ................................ 307/112, 113, 307/149, 42, 116, 139; 361/805; 365/231; 379/248; 385/17; 250/553; 340/826, 825.79; 342/373

[56] References Cited

U.S. PATENT DOCUMENTS

| | | | |
|---|---|---|---|
| 5,220,320 | 6/1993 | Assal et al. ........................ | 340/825.79 |
| 5,469,001 | 11/1995 | Vaillant .................................. | 307/113 |
| 5,576,872 | 11/1996 | Katajima et al. ........................ | 359/117 |
| 5,790,290 | 8/1998 | Kitajima et al. ........................ | 359/139 |
| 5,798,580 | 8/1998 | Morozov et al. ....................... | 307/112 |

OTHER PUBLICATIONS

Okayama et al. "Optical Switch Matrix With Simplified N X N Tree Structure", Journal of Lightwave Technology, vol. 77, pp. 1023–1028, Jul. 1989.

Primary Examiner—Fritz Fleming
Assistant Examiner—Peter Zura
Attorney, Agent, or Firm—Sughrue, Mion, Zinn, Macpeak & Seas, PLLC

[57] ABSTRACT

A switch network comprises N input ports and T output ports for mutually and individually connecting any P ($P \leq N$ and $P \leq T$) inputs and any P outputs. Each switch has four poles and is capable of connecting the first pole to a second, a third or a fourth and correspondingly connecting the third pole to the fourth, first or second poles. The network includes switches disposed in a matrix network including internal switches each connected by its four poles to four adjacent switches and peripheral switches each located on the periphery of the matrix network. At least some of the peripheral switches are connected by at least one pole to an input or an output and by at least two other poles to two switches of the network.

1 Claim, 4 Drawing Sheets

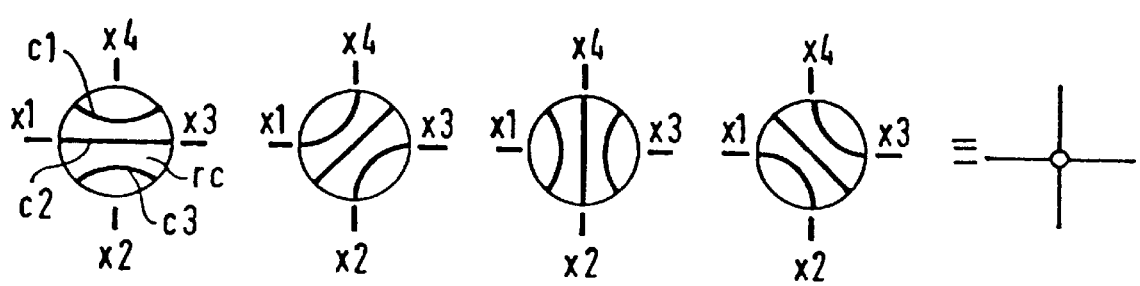
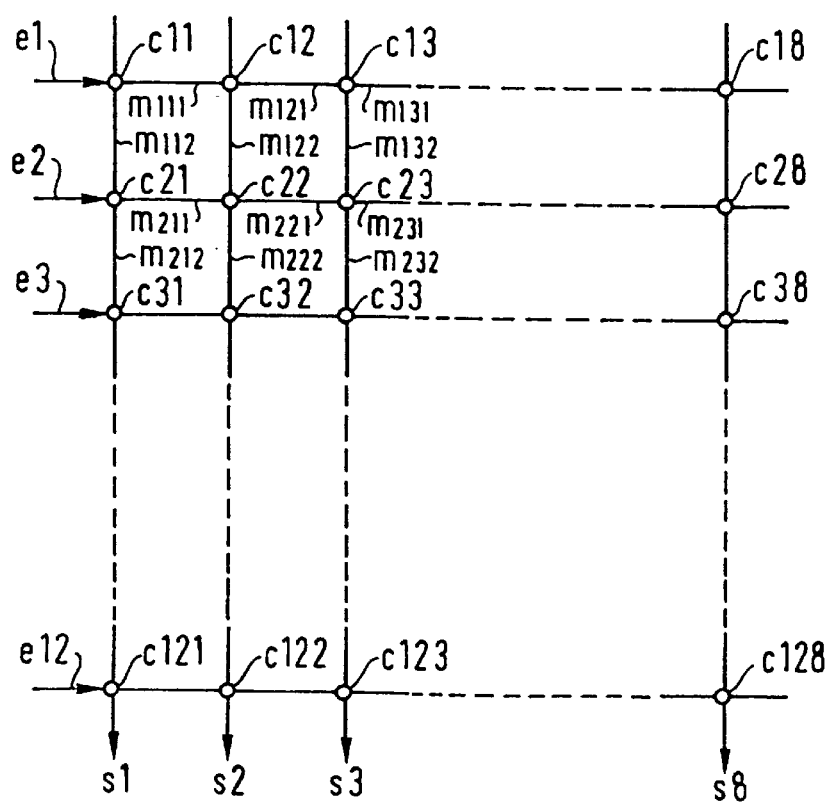

SWITCH NETWORK

BACKGROUND OF THE INVENTION

1. Field of the Invention

This invention relates to a switch network comprising N inputs and T outputs for mutually and individually connecting any P (P≦N and P≦T) inputs chosen from the N inputs and any P outputs chosen from the T outputs.

By varying on the positions of the switches in the switch network it is possible to alter the choice of the P inputs or the P outputs that are mutually and individually connected.

This rearrangement must be done causing a minimum of disturbance, i.e., by making the smallest possible number of changes to existing individual connections.

Of course, the terms inputs and outputs as employed above are interchangeable from the point of view of the switch network, which means that only the relation T>N need be maintained.

2. Description of the Prior Art

Switching networks are installed for example in telecommunication satellites to establish P simultaneous communication channels to be chosen by the operator from N possible resources and to connect the channels individually to P out of T pieces of equipment of the same type to be associated with these resources.

They are used for example, to overcome failures of these pieces of equipment (to a maximum of T-P). As a rule, two symmetrical networks in which the switches are operated simultaneously are used on either side of the pieces of equipment.

This arrangement enables each of the P (out of N) inputs to be connected to one of the P (out of T) pieces of equipment, and enables this equipment then to be connected by the symmetrical network to one input out of T of this symmetrical network which will lead to an output having the same position as the input of the first network.

The switches used in these networks have four poles and are capable of connecting a first pole to a second, a third or a fourth and, correspondingly, connecting the third pole to the fourth, first or second poles. With no restrictions as to the assignment of numbers to poles more precisely, there are in the prior art:

- a three-position switch capable of connecting a first pole to a second and a third to a fourth, or a first pole to a third and a second to a fourth, or a first pole to a fourth and a second to a third; and
- a four-position switch capable of connecting a first pole to a second and a third to a fourth, a first to a third, a first to a fourth and a second to a third, or finally in the last position a second to a fourth.

Different structures of such switch networks are disclosed in U.S. Pat. No. 5,469,001. In these structures, the essential aim is to minimize the number of switches, because of their weight and their cost. The implementation of these structures is specific to each application. This produces a form of network consisting of inputs, outputs, switches and links. These links are in the form of voluminous, solid waveguides. Links that are too long must be provided with flexible waveguide sections to absorb expansion. Thus, the physical layout of the network is defined by locating its component switches and waveguides in a network structure. The most constraining feature in this respect is the routing of the waveguides as they are voluminous and their curvatures must be limited, which makes it desirable to achieve as straight a path as possible for each waveguide, an objective that is impeded by the fact that an installed waveguide hinders the routing of other waveguides that must cross it, the crossings requiring changes of height. This necessitates an expensive layout design procedure leading to complex routings and entails a high cost in the manufacture of the waveguides resulting in, generally, a switch network of relatively high cost and weight.

The same drawbacks are found in links constructed using other technologies (notably coaxial or microstrip lines).

The aim of this invention is to overcome all these drawbacks by providing a switch network that has a simple layout and that can benefit extensively from earlier implementations, in which the links between switches are all straight and short, and that can be constructed as modules.

SUMMARY OF THE INVENTION

The switch network of the invention includes four-pole switches for connecting a first pole to a second, a third or a fourth and correspondingly for connecting the third pole to the fourth, first or second poles, wherein the four-pole switches are disposed in a matrix network including internal switches each connected by its four poles to four adjacent poles and peripheral switches each located on the periphery of the matrix network, at least some of the peripheral switches being connected by at least one pole to an input or an output and being connected by at least two other poles to two switches of the network.

Although U.S. Pat. No. 5,576,872 and European patent EP 0 446 437 A2 describe matrix networks, these do not consist of switches of the above type, the use of which in such networks has not been previously considered.

Advantageously, all the peripheral switches are adapted to be connected by at least one pole to an input or an output and by at least two other poles to two switches of the network.

Advantageously, at least some of the peripheral switches are adapted to be connected by two poles to two inputs or outputs and by two other poles to two switches of the network.

Advantageously, all the peripheral switches are adapted to be connected by two poles to two inputs or outputs and by two other poles to two switches of the network.

Preferably, along the periphery of the network, groups of peripheral switches are defined, all the switches of a group are connected either to inputs or to outputs, and successive groups of switches are connected alternately one group to inputs and the other to outputs.

The different features and advantages of the invention will become more apparent from the following description of embodiments of the invention.

BRIEF DESCRIPTION OF THE DRAWINGS

In the appended drawings, given by way of non-limiting example:

FIGS. 1a to 1e are different representations of a four-position switch usable in the network of the invention, FIG. 2 shows one example of a switch network constituting a first embodiment of the invention.

Figure 3:
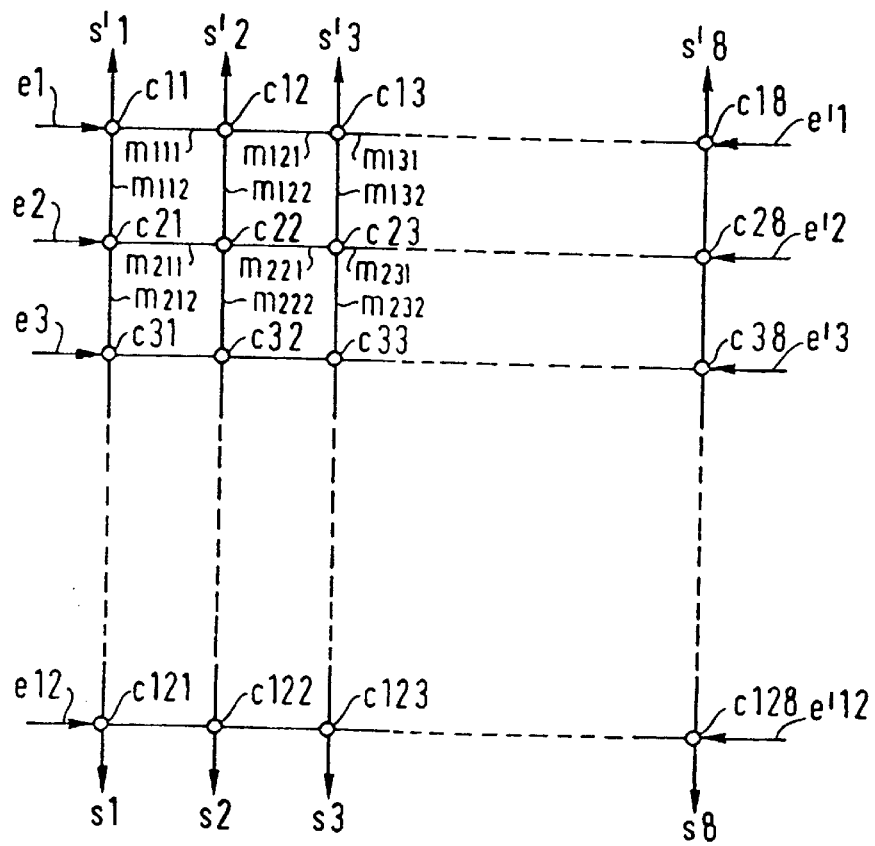
FIG. 3 shows one example of a switch network constituting a second embodiment of the invention.

The switch shown in FIGS. 1a to 1e includes four poles x1, x2, x3, x4 interconnected, according to their positions, by a rotary member rc provided with connection channels c1, c2, c3. fn FIG. 1a it establishes the connection x1-x3, in FIG. 1b it establishes the connections x1-x4 and x2-x3, in FIG. 1c it establishes the connection x4-x2 and in FIG. 1d it establishes the connections 1l-x2 and x4-x3.

FIG. 1e shows a convenient symbol for representing this switch in the subsequent Figures.

A variant of this switch with only three positions, not shown, establishes the connections of FIGS. 1a and 1c at the same time.

FIG. 2 shows an example of a switch network constituting a first embodiment of the invention. Four-pole switches of one of the two types described above are disposed in a matrix network including switches c11, c12, c13 . . . , c18 in a first row, switches c21, c22 . . . in a second row and so on up to switches c121, c122, c123 . . . , c128 in a twelfth row.

Switch c11 is connected by links m111 and m112 to switches c12 and c21; similarly switch c12 is connected by links m121 and m122 to switches c13 and c22, and so on along the row. Switch c21 is connected by links m211 and m212 to switches c22 and c31; similarly switch c22 is connected by links m221 and m222 to switches c23 and c32, and so on along the row. The linking continues in this way throughout the matrix.

Inputs e1, e2, e3 . . . , e12 are connected to switches c11, c21, c31 . . . , c121. Outputs s1, s2 . . . are connected to switches c121, c122, c123 . . . , c128.

It is possible to distinguish in this network between internal switches such as c22, c23, c32, c33 . . . , each connected by its four poles to four adjacent switches, such as switch c22 connected by its four poles and links m211, m122, m221 and m222 to switches c21, c12, c23 and c32, and peripheral switches each located on the periphery of the matrix network, such as c11, c12, c13 . . . , c18, c28, c38 . . . , c21, c31 . . . , c121, c122, c123 At least some of these peripheral switches are each connected by at least one pole to an input or an output and by at least two other poles to two switches of the network. Thus, switch c11 is connected to input e1, has an unconnected pole and is connected to switches c12 and c21 which are also peripheral switches. Switches c21, c31 . . . are also connected to a single input. Switch c121 however has two poles respectively connected to an input e12 and an output s1.

The network of FIG. 2 can be used to establish up to eight connections between eight inputs chosen from inputs e1 to e12 and eight outputs s1 to s8 providing that these connections do not cross, i.e. inputs in the order e1 to e12 are connected to outputs in the order s1 to s8. This restricts the choice of connections to be established, which is acceptable in practical applications.

The network as shown in FIG. 2 maintains between the switches only links that go from one switch to a neighboring switch and do not cross any other switch and so the links can be very short. In addition, it is easy to derive from an existing network such, as the 8×12 type shown in FIG. 2, a similar larger or smaller network. This significantly simplifies the design work for each new application. In addition, the network as shown in the figure can be composed of modular elements, "blocks" of 2×2 switches for example (c11, c12, c21, c22, for example), interconnected by layers of straight, parallel links.

However, the peripheral switches have one or even two unused poles, which does not represent an efficient use of the network elements.

FIG. 3 shows an example of a switch network constituting a second embodiment of the invention derived from that of FIG. 2 but in which the switches are better utilized.

This second network is similar to that of FIG. 2, the same references being used to denote the same elements; it differs from the first only in that all the peripheral switches are adapted to be connected by at least one pole to an input or an output and by at least two other poles to two switches of the network. Thus switches c11, c12, c13 . . . , c18 give access to outputs s'1, s'2, s'3 . . . , s'8 and switches c18, c28, c38 . . . , c128 give access to inputs e'1, e'2, e'3 . . . , e'12.

Because the general structure of the network is retained, the advantages of the network from FIG. 2 are obtained.

The previous remark about restrictions concerning the connections which can be established in the network is modified in that, along the periphery of the network, groups of peripheral switches (c11 . . . , c18; c18 . . . , c128; c128 . . . , c121; c121 . . . , c11) are defined, all the switches of a group being connected either to inputs or to outputs, while successive groups of switches are connected alternately one group to inputs and the other to outputs. This obviously adds flexibility but without eliminating all restrictions, since up to four groups of connections can be distinguished, each time between a part of a group of "input" switches and a connected part of a group of "output" switches, for example between c11, c21, c31 and c11, c12, c13. Of course, the connections of a group of connections must not cross each other; the same applies between the groups.

Note, however, that the peripheral switches other than those at the corners of the network give access to only one input or one output. Each connects it usefully to one link of the network, which means that at most two poles of the switch are used at a time and consequently the utilization of these switches is poor.

Figure 4:
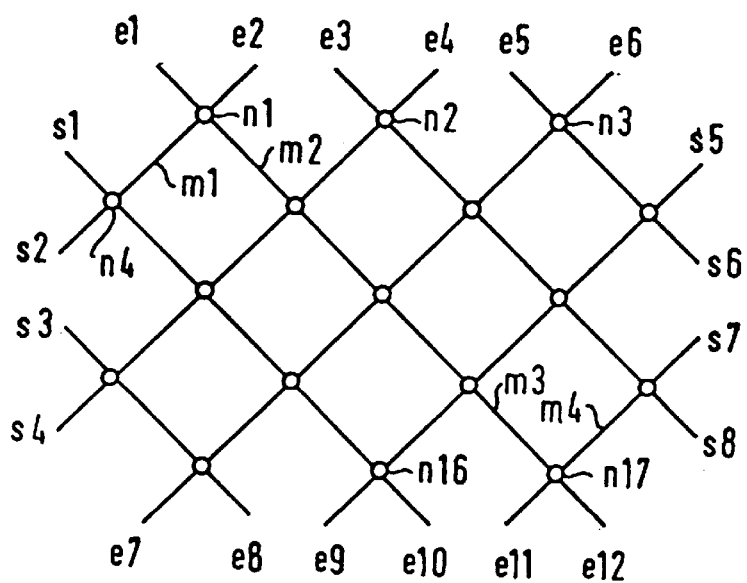
FIG. 4 shows one example of a switch network constituting a third embodiment of the invention.

FIG. 4 shows an example of a switch network constituting a third embodiment of the invention, conforming to that of FIG. 1, used to establish connection paths between 12 inputs e1 to e12 and eight outputs s1 to s8 and wherein the four-pole switches are disposed in a matrix. However, these switches n1, n2, n3 . . . , n16, n17 and the links m1, m2, m3, m4 that interconnect them constitute a matrix which is skewed, as it were, with respect to a rectangular arrangement of inputs and outputs, as shown in the drawing, and has the shape of a rhombus or a parallelogram.

Geometrically, the rhomboid or parallelogram form, rather than a square or rectangular form, does not affect the advantages derived from a matrix structure, as explained in relation to the network from FIG. 2.

The "input" and "output" groups of the network from FIG. 3 appear in the network shown in FIG. 4. The same remark concerning the restrictions affecting the groups of input and output switches still applies mutatis mutandis.

Compared to the arrangements of FIGS. 2 and 3, that of FIG. 4 offers the advantage of a better ratio between the number of inputs/outputs and the number of switches. In the case of an 8×12 matrix, the network from FIG. 2 comprises 96 switches, that from FIG. 3 24 switches and that from FIG. 4 only 17 switches. Of course, the number of connection paths available diminishes accordingly, but this is not a drawback in some applications.

This greater efficiency results from the fact that at least some of the peripheral switches are adapted to be connected by two poles to two inputs or outputs and by two other poles to two switches of the network. Thus, switch n1 is connected to two inputs e1 and e2 and switch n4 is connected to two outputs s1 and s2

More particularly, in the case of the network of FIG. 4, all the peripheral switches are adapted to be connected by two poles to inputs or outputs and by two other poles to two switches of the network.

Figure 5:
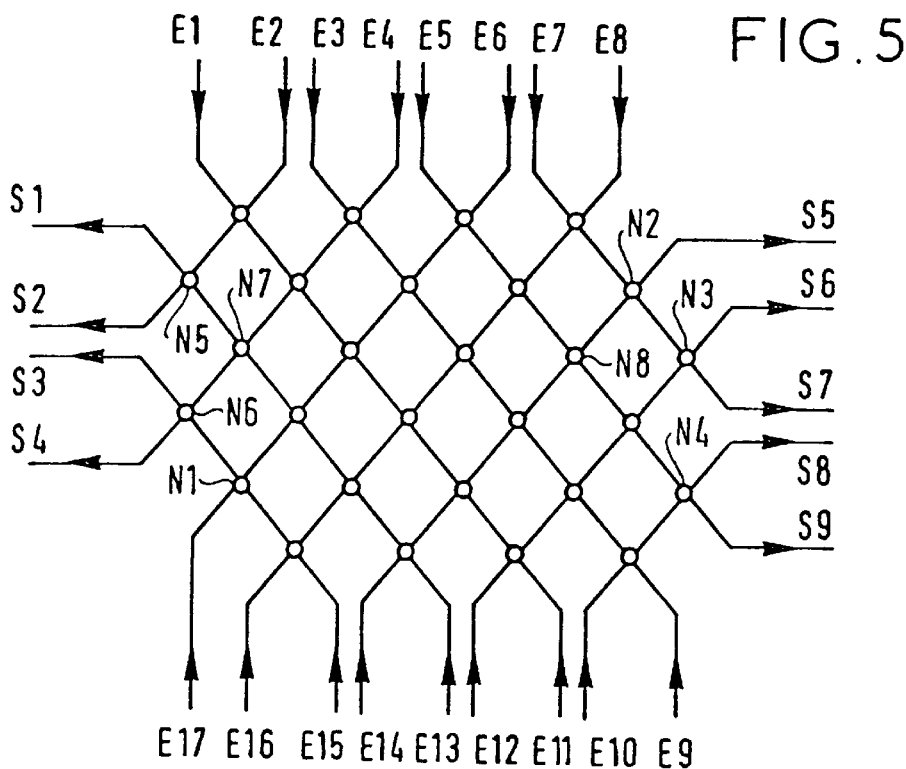
FIG. 5 shows one variant of the network of FIG. 4.
Figure 6:
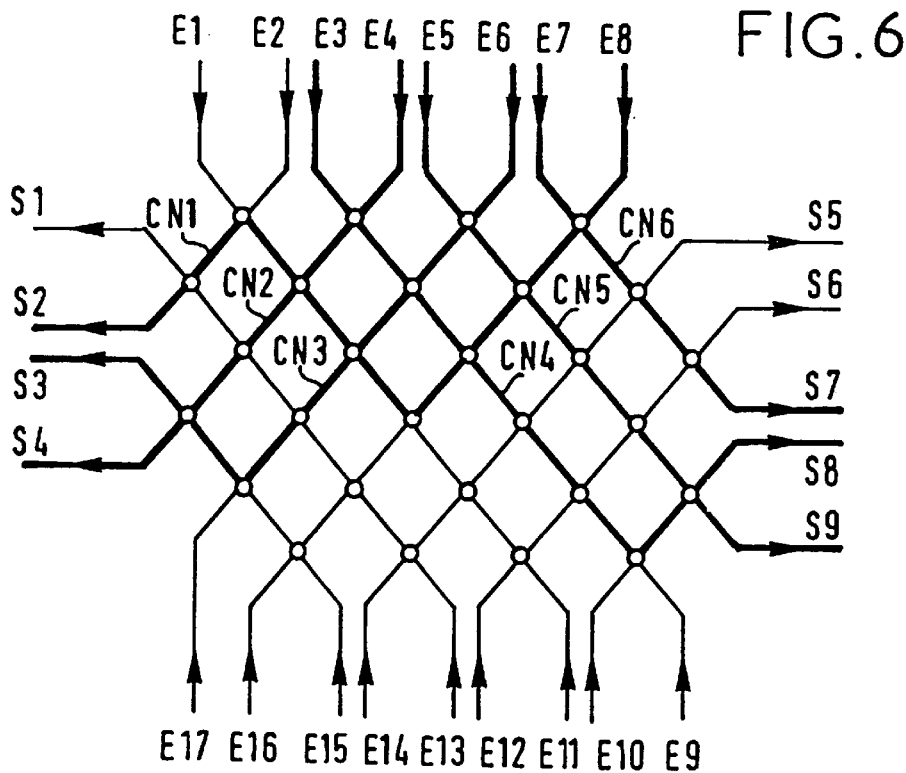
FIG. 6 shows the network of FIG. 5 showing an outline of the connections established.

FIG. 5 shows a variant of the switch network from FIG. 4. Its structure is the same but it allows the connection of 17 inputs E1 to E17 and nine outputs S1 to S9. The additional switches in the matrix constituting this network increase the number of possible connection paths and releases on some switches, such as N1 and N2, a port to which an input E17 or an output S5 is connected FIG. 6 shows, by way of example of the use of the switch network of FIG. 5, and in bold line, the paths of six connections extending in order from E3 to E8, to S2 to S4 and S7 to S9.

Figure 7:
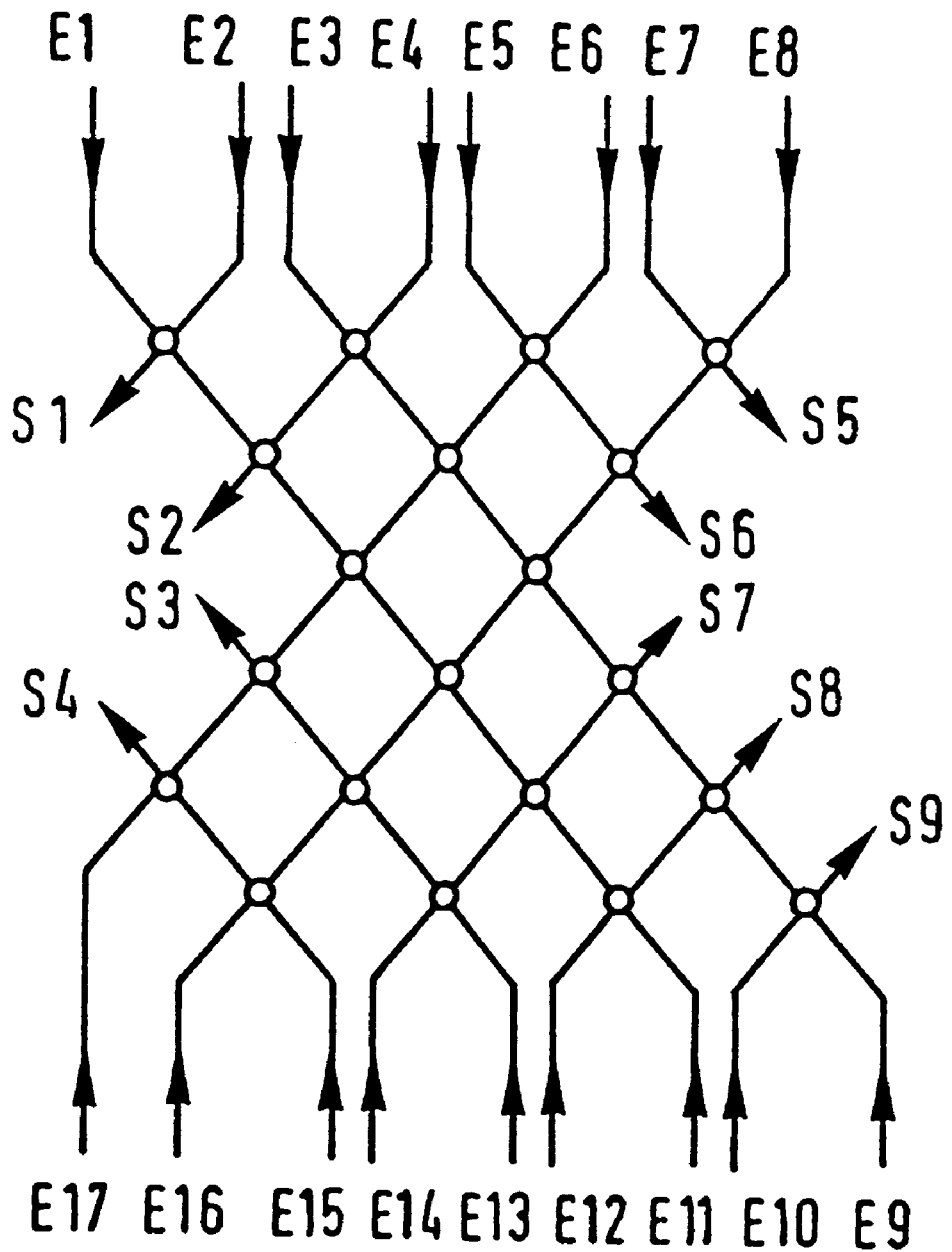
FIG. 7 shows one variant of the switch network of FIG. 5.

FIG. 7 shows a variant of the switch network of FIG. 5 in which, at the cost of restrictions affecting the numbers and the paths of the connections to be established, the number of switches can be drastically reduced by eliminating peripheral switches N2, N3, N4, N5, N6 from the matrix shown in FIG. 5 and eliminating even two internal switches N7 and N8, to connect outputs S1 to S9 directly to the poles of the remaining switches of the matrix which this frees up.

The networks shown in FIGS. 5 and 7 show that it is easy to conceive variants of the switch network of the invention to handle greater or smaller capacities, both in terms of the numbers of input and output ports and in the number of connections allowed in the network. The feature of modularity mentioned with respect to the network from FIG. 2 can also be retained in its essentials in the networks shown in the subsequent figures.

There is claimed:

1. A switch network comprising:

N input ports and T output ports for mutually and individually connecting any P ($P \leq N$ and $P \leq T$) inputs and any P outputs, each switch of said switch network having four poles and being capable of connecting a first pole to a second, a third or a fourth pole and correspondingly connecting said third pole to said fourth, first, or second poles;

wherein said switches are disposed on lines and on columns;

wherein at least one internal switch is connected by its four poles to four adjacent switches;

and wherein:

each switch of a first line has two poles respectively connected to two input ports, and two poles connected to other switches;

each switch of a last line has two poles respectively connected to two input ports, and two poles connected to other switches;

each switch of a first column has two poles respectively connected to two output ports, and two poles connected to other switches;

each switch of a last column has two poles respectively connected to two output ports, and two poles connected to other switches.

* * * * *